US011480294B2

(12) United States Patent
Beale et al.

(10) Patent No.: US 11,480,294 B2
(45) Date of Patent: Oct. 25, 2022

(54) TAPERED STRUT WITH MECHANICAL FITTINGS

(71) Applicant: Crompton Technology Group Limited, Solihull (GB)

(72) Inventors: Thomas Beale, Faringdon (GB); James Bernard, Brackley (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 641 days.

(21) Appl. No.: 16/424,740

(22) Filed: May 29, 2019

(65) Prior Publication Data
US 2020/0056743 A1 Feb. 20, 2020

(30) Foreign Application Priority Data

Aug. 16, 2018 (EP) .................................... 18275124

(51) Int. Cl.
*F16B 9/00* (2006.01)
*F16B 7/18* (2006.01)
*F16S 3/00* (2006.01)

(52) U.S. Cl.
CPC .................. *F16S 3/00* (2013.01); *F16B 7/18* (2013.01); *F16B 9/054* (2018.08)

(58) Field of Classification Search
CPC ..... B29C 65/562; B29C 65/64; B29C 66/534; B29D 99/0046; F16B 7/18; F16B 7/187; F16B 2200/503; F16B 2200/506; F16B 9/052; F16C 3/023; F16C 3/026;
(Continued)

(56) References Cited

U.S. PATENT DOCUMENTS

| 579,986 | A | * | 4/1897 | Jordan | .................... F16L 19/04 285/334.1 |
| 1,802,499 | A | * | 4/1931 | Chapman | ................ F16L 33/23 285/253 |
| 3,778,185 | A | | 12/1973 | Plowman et al. | |

(Continued)

FOREIGN PATENT DOCUMENTS

| CN | 201645726 U | 11/2010 |
| DE | 939601 C | 2/1956 |

(Continued)

OTHER PUBLICATIONS

Extended European Search Report for International Application No. 18275124.8 dated Mar. 4, 2019, 5 pages.

*Primary Examiner* — Jonathan P Masinick
(74) *Attorney, Agent, or Firm* — Cantor Colburn LLP

(57) ABSTRACT

A composite tapered tubular assembly includes a composite tapered tube extending between a first end and a second end and tapered so as to have a smaller radius R1 at the first end than a radius R2 at the second end. The assembly also includes a first internal annular wedge that is in contact with an inner surface of the tube at said first end and a first external annular wedge in contact with the outer surface of the tube at said first end. The assembly further includes a first nut provided at said first end that is configured to be connected to said first internal wedge and a second external annular wedge provided on an outer surface of the tube and a second internal annular wedge in contact with the inner surface of said composite tube at said second end, and a second nut connected to an internal surface.

9 Claims, 3 Drawing Sheets

(58) Field of Classification Search
CPC ............ Y10T 403/57; Y10T 403/5753; Y10T 403/573; Y10T 403/68
See application file for complete search history.

(56) References Cited

U.S. PATENT DOCUMENTS

| | | | | |
|---|---|---|---|---|
| 4,373,832 | A * | 2/1983 | Monteillet | F16C 7/06 403/374.4 |
| 4,848,957 | A * | 7/1989 | Umeda | B29C 70/86 403/374.4 |
| 5,318,374 | A * | 6/1994 | Rumberger | F16B 4/006 403/277 |
| 9,482,266 | B2 * | 11/2016 | Dewhirst | F16C 3/026 |
| 9,873,506 | B2 * | 1/2018 | Goldring | B23K 31/02 |
| 10,066,649 | B2 * | 9/2018 | Ganis | F15B 15/1447 |
| 10,598,200 | B2 * | 3/2020 | Bernard | F16C 7/026 |
| 10,612,568 | B2 * | 4/2020 | Giannakopoulos | F16C 7/026 |
| 2017/0198734 | A1 * | 7/2017 | Bernard | F16B 7/02 |
| 2019/0128449 | A1 * | 5/2019 | Beale | F16B 7/182 |

FOREIGN PATENT DOCUMENTS

| | | | |
|---|---|---|---|
| DE | 2950581 A1 * | 6/1981 | |
| DE | 102016221978 A1 * | 5/2018 | |
| EP | 3133298 A1 | 2/2017 | |
| EP | 3193029 A1 | 7/2017 | |
| JP | 2005069314 A | 3/2005 | |

\* cited by examiner

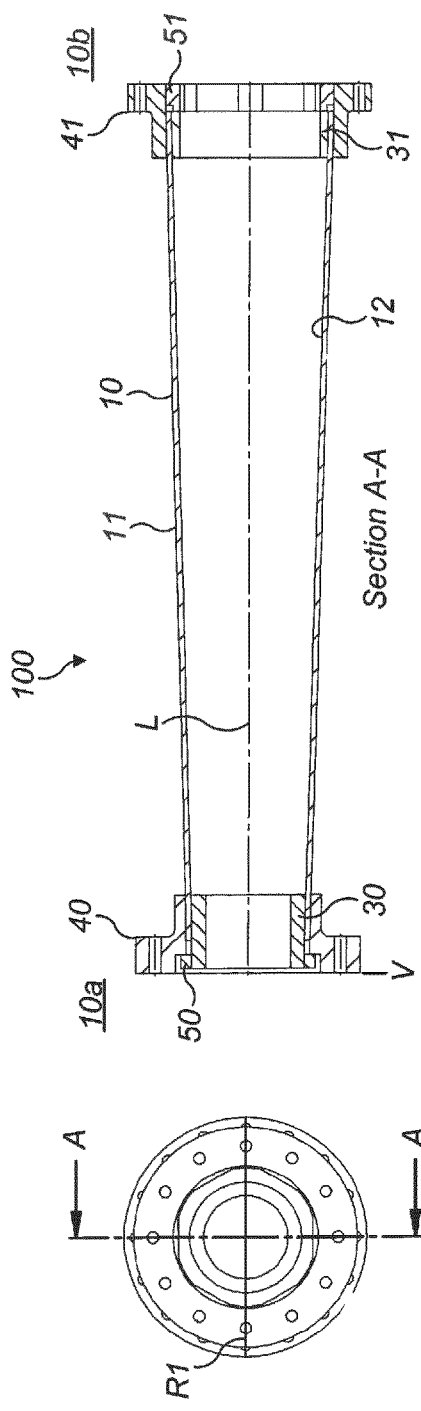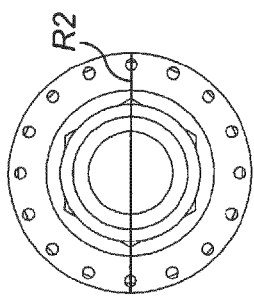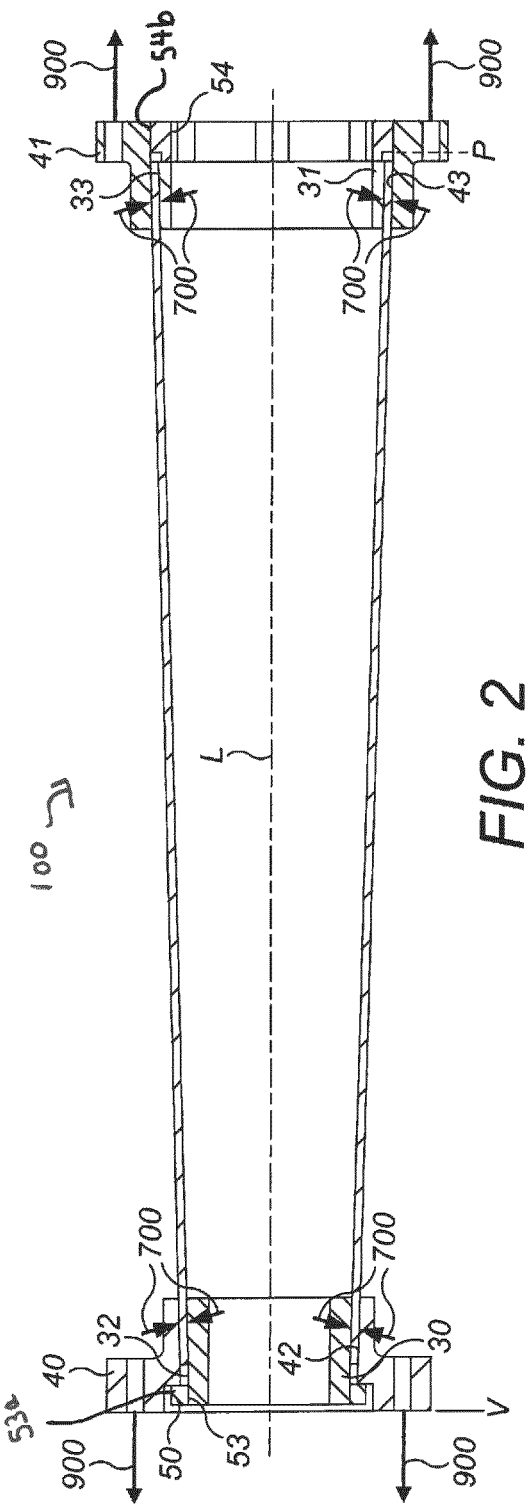

TAPERED STRUT WITH MECHANICAL FITTINGS

FOREIGN PRIORITY

This application claims priority to European Patent Application No. 18275124.8 filed Aug. 16, 2018, the entire contents of which is incorporated herein by reference.

TECHNICAL FIELD

The disclosure relates to composite assemblies that may be used for forming a connection with another component.

BACKGROUND

Composite structures are often used for a range of various connecting or joining applications due to their inherent strength to weight ratio. For example, composite tubular assemblies are currently employed to connect components together, and used in many fields including the motor sports, marine, aerospace and medical fields. In use, these assemblies may be subjected to axial tensile and compressive loads as well as bending and torque loadings, for example, when used to provide rods or struts. With increasing demand to transmit working loads directly through to the composite tubular assembly comes a requirement also to provide a suitable end fitting or connector arrangement.

JP 2005069314 A describes a lightweight rod structure that is larger in the center and becomes smaller towards both ends. U.S. Pat. No. 3,778,185 A describes a composite strut joint construction that has tapering surfaces forming a wedge-shaped cavity. CN 201645726 U describes a mold for producing a fiber reinforced resin tapered rod.

SUMMARY

A composite tapered tubular assembly is described herein comprising a composite tapered tube extending between a first end and a second end, the tube being tapered so as to have a smaller radius R1 at the first end than a radius R2 at the second end; and a first internal annular wedge provided to be in contact with an inner surface of the tube at the first end and a first external annular wedge provided to be in contact with the outer surface of the tube at the first end and a first nut provided inside of the tube at the first end, configured to be connected to the first internal wedge and the assembly further comprising: a second external annular wedge provided on an outer surface of the tube and a second internal annular wedge provided to be in contact with the inner surface of the composite tube at the second end, and a second nut connected to an internal surface of the second external annular wedge.

The second nut may also further comprise a lip feature that contacts a face of the second internal annular wedge.

In some examples, the composite tapered tube may extend along a longitudinal axis L and the lip feature may extend in a plane P that is perpendicular to the longitudinal axis L. In some examples, the longitudinal axis L is also the central axis of the inner and external wedges and also the central axis of the nut.

In some examples, the first nut may be connected to a surface of the first external wedge that extends in a plane P that is perpendicular to the axis L along which the tube extends. That is, the first nut may be connected to the first external wedge at the nut's perpendicular surface, whereas the second nut may be connected to the second external wedge at the nut's parallel surface. This allows for the nut at the second end to be smaller and this therefore may reduce the mass of the assembly.

In some examples, the first nut may be screwed onto the first internal annular wedge.

In some examples, the second nut may be threaded into the second external wedge.

In some examples, an internal diameter of the second external annular wedge may exceed an external diameter of the first external annular wedge.

A method of making a composite tapered tubular assembly is also described herein comprising providing a composite tapered tube extending between a first end and a second end, the tube being tapered so as to have a smaller radius R1 at the first end than a radius R2 at the second end; and providing a first internal annular wedge so as to be in contact with an inner surface of the tube at the first end and providing a first external annular wedge so as to be in contact with the outer surface of the tube at the first end, and providing a first nut at the first end of the tubular member, and connecting the first nut to the first internal wedge, the method further comprising: providing a second external annular wedge on an outer surface of the tube and providing a second internal annular wedge to be in contact with the inner surface of the composite tube, and connecting a second nut to an internal surface of the second external annular wedge.

In some examples, the method may further comprise providing a lip feature on the second nut, and contacting the lip feature with a face of the second internal annular wedge.

In some examples, the method may comprise providing the lip feature so that it extends in a plane P that is perpendicular to the longitudinal axis L.

In some examples, the method may further comprise connecting the first nut to a surface of the first external wedge that extends in a plane P that is perpendicular to a longitudinal axis L along which the tube extends.

In some examples, the method may further comprise screwing the first nut onto the first internal annular wedge.

In some examples, the method may further comprise threading the second nut into the second external wedge.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 1a depicts an end view of a composite tapered tubular assembly, showing the smaller end.

FIG. 1b depicts a side cross-sectional view of a composite tapered tubular assembly, taking across the section A-A of FIG. 1a.

FIG. 1c depicts an end view of a composite tapered tubular assembly, showing the larger end.

FIG. 2 depicts a side cross-sectional view of a composite tapered tubular assembly, taken across the section A-A of FIG. 1a depicting the service loads and preloads.

DETAILED DESCRIPTION

Figure 3:
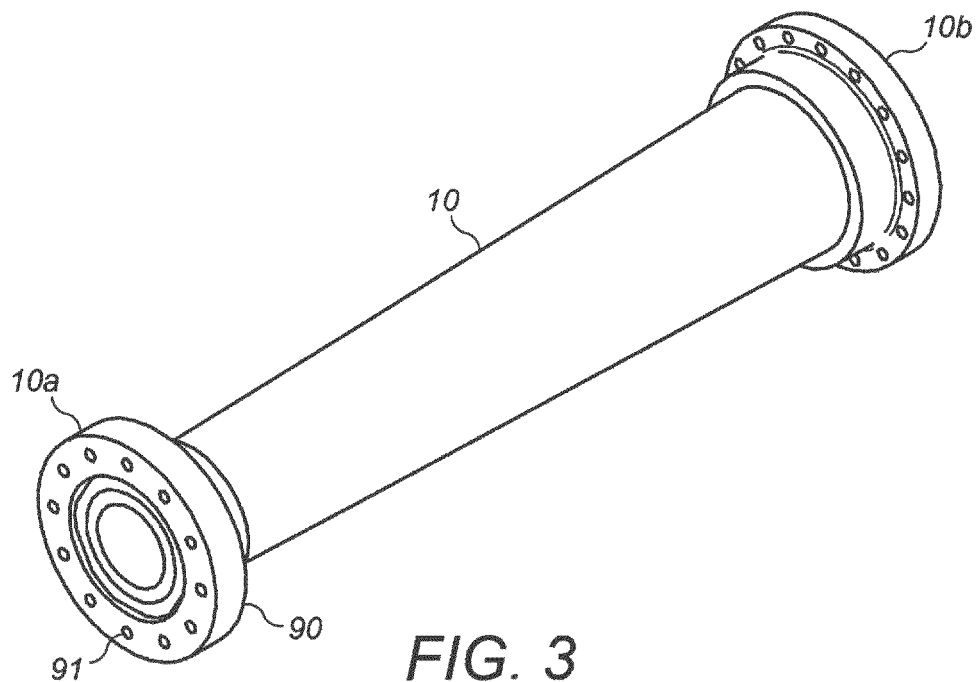
FIG. 3 depicts a planar view of the composite tapered tubular assembly of FIG. 1b showing in particular the smaller end.

As will be described below, the examples herein relate to a mechanical, non-bonded method of joining a composite tapered tubular assembly 100 to an end fitting such that the assembly 100 may be assembled to a space frame assembly (or other mechanism, not shown), to thereby transfer significant tensile and compressive loads 900. The examples also relate to the composite assembly itself.

FIG. 2 depicts a cross-sectional view of the composite tapered tubular assembly showing these service loads 900 which may be either positive or negative. This figure also depicts the initial preloads 700 to the clamp composite.

FIGS. 1a to 1c depict an example of a new type of composite tapered tubular assembly 100 as described herein. This composite tapered tubular assembly comprises, (as well as potentially other components), a tapered composite tube 10. FIG. 1b depicts a cross-sectional view of the composite tapered tube 10, taken along the section A-A as shown in FIG. 1a. The composite tapered tube 10 extends between a first end 10a and a second end 10b. The composite tapered tube 10 is tapered in that it has a smaller radius R1 at the first end 10a than the radius R2 at the second end 10b. FIG. 1a shows the first end 10a and FIG. 1c shows the second end 10b. The composite tapered tube 10 extends longitudinally between the first end 10a and the second end 10b and also has an inner surface 12 and an outer surface 11. The entire composite tapered tube 10 tapers inwardly in the direction of the first end 10a from the second end 10b as shown in FIG. 1b. The composite tapered tube 10 therefore narrows in the longitudinal direction towards the first end 10a.

The composite tapered tube 10 may be assembled to another component or components (not shown). In some examples, the composite tapered tube 10 may be assembled to a metallic component or components at either, or both ends 10a, 10b, to transfer these service loads 900.

As can be seen in FIG. 1b and FIG. 2, at the first end 10a of the tapered tube 10, which has the smaller radius R1, a first internal annular wedge 30 is fitted to the inside of the tube 10 and a first external wedge 40 is fitted to the outside of the tube 10 so as to sandwich the tube between these wedges 30, 40. These annular wedges 30, 40 are ring shaped components that are also tapered internally and/or externally in the longitudinal direction (i.e. the direction towards the first end 10a from the second end 10b) so that they follow the contours/angles of the inner and outer surfaces of the tube 10. For this reason, they are referred to herein as "wedges". In some examples, the thickness of these ring-shaped components may vary in the direction of the first end 10a and in other examples the thickness may remain constant, whilst still reflecting the tapered shape of the inner and outer surfaces of the tube 10. A first nut 50 may also be provided so as to be at least partially provided inside of the tube 10 and this nut 50 is screwed onto/into the first internal wedge 30.

The first nut 50 may then be tightened within said first internal annular wedge 30 so that it is also pressed against an inner surface of the first external annular wedge 40. The composite tapered tube 10 is thereby clamped and compressed between the first external annular wedge 40 and the first internal annular wedge 30. Clamping the different components of the assembly composite in this way prevents the contact surfaces from separating and also inhibits or prevents sliding between the contact surfaces. This also avoids abrasion between the contact surfaces of the composite and so provides the advantage of lengthening the life of the composite assembly 100.

At the second end 10b of the composite tapered tube 10 (i.e. the end having a larger radius R2), a second external annular wedge 41 is fitted onto the outer surface of the tubular composite member 10. Similarly, a second internal annular wedge 31 is fitted inside of the composite tubular member 10 so that the tube 10 is sandwiched between the two wedges 31, 41. In the same way as for the first end 10a of the tube, these annular wedges 31, 41 are ring-shaped components that are also tapered internally/and or externally in the longitudinal direction (i.e. in the direction towards the first end 10a from the second end 10b) so that they also follow the contours of the inner and outer surfaces of the tube 10. For this reason, they are also referred to as "wedges". In some examples, the thickness of these ring-shaped components may vary in the direction of the first end 10a and in other examples the thickness may remain constant, whilst still reflecting the tapered shape of the inner and outer surfaces of the tube 10. The annular wedges 30, 31, 40, 41 and the composite tapered tube 10 may therefore be described as having a conical shape.

In summary, each of the inner 11 and outer surfaces 12 of the tube 10 are tapered inwardly towards the first end 10a at the same angle at which the annular wedges 30, 31, 40, 41 are tapered so that they have matching conical (or tapered) surfaces that contact each other.

Figure 5:
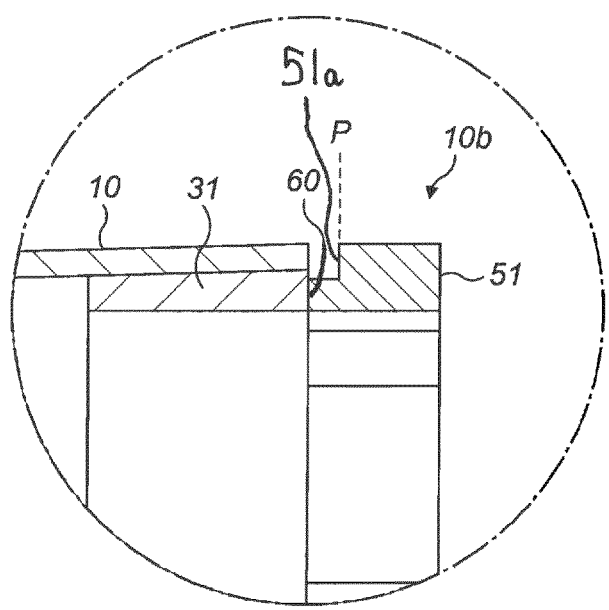
FIG. 5 depicts a cross-section of the second nut showing the lip feature of the nut.

A second nut 51 may also be threaded into the internal surface 43 of the second external annular wedge 41. At this end, the second nut 51 may also comprise a lip feature (shown in FIG. 5 as 60) that contacts the vertical face of the second internal annular wedge 31 (i.e. in a plane P that is generally perpendicular to the longitudinal axis L of the tube 10). The longitudinal axis of the tube 10 is also the central axis of each of the internal and external wedges and also the central axis of the nuts. This lip feature 60 can be seen in FIG. 5, which shows a close up view of the second nut 51 (with the external wedge 41 removed). This second nut 51 may be tightened so that the second end 10b of the composite tapered tube 10 is compressed between the second external annular wedge 41 and the second internal annular wedge 31. In FIG. 5, the lip 60 is already in contact with the embedded second internal wedge 31. As nut 51 is screwed into the second external wedge 41, the lip 60 applies more pressure onto the second internal wedge 31. The tube 10 is therefore being squeezed by both the second external wedge 41 and the second internal wedge 31.

In an example wherein a lip feature 60 is provided on the second nut 51, the second internal annular wedge 31 is pushed by the lip 60 onto the second nut 51. The lip feature 60 is therefore adjacent to and in contact with the second internal wedge 31. The lip 60 therefore prevents the surface 51a of the second nut 51 (that is extending in the plane P, see FIG. 5) from contacting the tube 10.

Each of the first and second nuts 50, 51 have an surface 53, 54 and an outer surface 53a, 54b. The external annular wedges 40, 41 provided externally at each end of the tapered composite tube 10 also have an inner surface 42, 43 that is in contact with the outer surface 11 of the tapered composite tube 10. The internal annular wedges 30, 31 provided at each end of the composite tapered tube 10 also have an outer surface 32, 33 that is therefore in contact with the inner surface 12 of the tapered composite tube 10. As discussed above, at the first end, the nut 50 is screwed onto internal annular wedge 30. In particular, the nut 50 is screwed so as to be pressed against the vertical plane surface V of external wedge 40, i.e. against the surface of the external wedge 40 that extends in a plane P that is perpendicular to the longitudinal axis L of the tube.

At the second end, the nut 51 is threaded into the external wedge 41. The lip feature 60 of the nut 51 therefore makes contact with the internal wedge 31. As the nut 51 is screwed in, the lip 60 presses against the wedge 31 to squeeze the composite tube.

For assembly purposes, in some examples, the internal diameter of the second external annular wedge 41 should exceed the external diameter of the first external annular wedge 40. The examples are not limited to this, however, and in some examples the second external annular wedge 41 may also be split into sections circumferentially, assembled onto the composite tapered tube 10 and then secured together.

Figure 4:
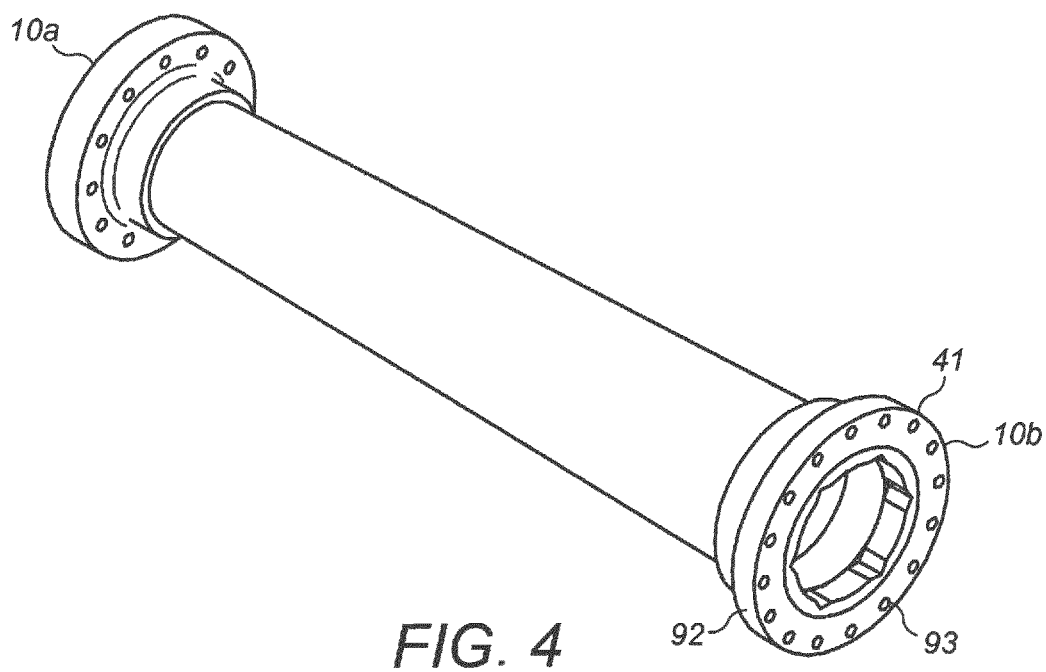
FIG. 4 depicts a planar view of the composite tapered tubular assembly of FIG. 1b showing in particular the larger end.

During use, service loads 900 may be applied either negatively or positively to either or both ends of the composite tapered tubular assembly 100. In some examples, service loads 900 may be applied to the first end 10a by specially-designed features, such as a flange 90 and bolt holes 91 (as shown in FIG. 3). At the second end 10b, the service loads 900 may also be applied to the second external annular wedge 41 by means of specially-designed features, such as a flange 92 and bolt holes 93 (as shown in FIG. 4).

In tension, an end fitting (not shown) pulls on the second external annular wedge 41, which in turn pushes into the external surface of the tubular member 10. This is because as the wedge 41 is being pulled (to the right with respect to the figures) the angle of the contact surface between the wedge 41 and the tube 10 means that the tube 10 is deflected (as if to make the tube smaller). In some examples, the end fitting may be connected via bolts which are slotted into bolt holes in the wedge 41. This would also be repeated at the opposite end. The tube 10 is supported by the second internal annular wedge 31 providing additional strength. In compression, the second external annular wedge 41 transfers load to the second nut 51 via a joining feature such as a thread (not shown). As the external wedge 41 is being pulled, the composite tube is therefore deflected radially towards the internal wedge 31. In compression, as the external wedge 41 is being pushed, the internal wedge 31 is also being pushed into the contact surface at the internal surface of the tube 10, via the nut 51. If the wedge 31 was not present to provide a surface for the tube to be squeezed into, the composite tube would fail sooner than if the wedge 31 were there. The second nut 51 pushes on the second internal annular wedge 31. The conical outer surface 33 of the second internal annular wedge 31 pushes into the composite tapered tube 10 to transfer the service load 900 into the composite tapered tube 10. The second external annular wedge 41 provides additional circumferential strength, in this case.

The examples described herein have many advantages. For example, the composite tapered tube 10 may be a single tapered shaft that is filament-wound or manufactured by tape-laying in a straightforward fashion with little difficulty. In such cases, the composite may be inspected for its quality easily.

There are also no abrupt changes in angle or cross-section, which reduces stress concentrations and increases strength. The tube may be manufactured without consideration towards encapsulating any of the metallic components, and so become a simple component itself. This eliminates the need for specially-designed extractable or sacrificial mandrels, or co-curing joint components, minimizing the cost of manufacture and removing the thermal expansion mismatch between these components.

The assembly also allows two interfaces of different sizes to be joined without compromising the size of the smaller interface (that is, the small end 10a is not oversized) leading to a reduction in mass. It may also be considered for applications that would typically use a straight strut and where a shallow taper angle is plausible as the overall cost may be reduced with the more straightforward composite manufacture and assembly. The absence of adhesive makes qualification of the joint easier to achieve.

In addition to this, as mentioned above, in some examples, the first nut may be connected to a surface of the first external wedge that extends in a plane P that is perpendicular to the axis L along which the tube extends. That is, the first nut may be connected to the first external wedge at the nut's perpendicular surface, whereas the second nut may be connected to the second external wedge at the nut's parallel surface. This allows for the nut at the second end to be smaller and this therefore may reduce the mass of the assembly.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A composite tapered tubular assembly comprising:
   a composite tapered tube extending between a first end and a second end, said tube being tapered so as to have a smaller radius (R1) at the first end than a radius (R2) at the second end;
   a first internal annular wedge provided to be in contact with an inner surface of the tube at said first end;
   a first external annular wedge provided to be in contact with an outer surface of the tube at said first end;
   a first nut provided at said first end, said first nut being configured to be connected to said first internal wedge; and
   a second external annular wedge provided on the outer surface of the tube;
   a second internal annular wedge provided to be in contact with the inner surface of said composite tube at said second end; and
   a second nut connected to an internal surface of the second external annular wedge;
   wherein said second nut comprises a lip feature that contacts a face of the second internal annular wedge;
   wherein said second nut has a central axis (L) and wherein said lip feature extends in a plane (P) that is perpendicular to said central axis (L).

2. The assembly of claim 1, wherein said first nut contacts a surface of the first external annular wedge that extends in a plane (P) that is perpendicular to a central axis (L) of the first external annular wedge.

3. The assembly of claim 2, wherein said first nut is screwed into said first internal annular wedge.

4. The assembly of claim 1, wherein said second nut is threaded into the second external annular wedge.

5. The assembly of claim 1, wherein an internal diameter of the second external annular wedge exceeds an external diameter of the first external annular wedge.

6. A method of making a composite tapered tubular assembly comprising:
  providing a composite tapered tube extending between a first end and a second end along a longitudinal axis (L), said tube being tapered so as to have a smaller radius (R1) at the first end than a radius (R2) at the second end;
  providing a first internal annular wedge so as to be in contact with an inner surface of the tube at said first end;
  providing a first external annular wedge positioned so as to be in contact with an outer surface of the tube so that said tube is sandwiched between said first inner and external annular wedges and providing a first nut at said first end; and
  connecting said first nut to said first internal wedge, said method further comprising:
  providing a second external annular wedge on the outer surface of the tube and
  providing a second internal annular wedge so as to be in contact with the inner surface of said composite tube so that said tube is sandwiched between said second inner and external annular wedges, and
  connecting a second nut to an internal surface of the second external annular wedge;
  providing a lip feature on said second nut, and contacting said lip feature with a face of the second internal annular wedge, wherein the lip feature is provided so that it extends in a plane (P) that is perpendicular to said longitudinal axis (L).

7. The method of claim 6, further comprising connecting said first nut to a surface of said first external annular wedge that extends in a plane (P) that is perpendicular to a longitudinal axis (L) along which the tube extends.

8. The method of claim 6, further comprising:
  screwing said first nut into said first internal annular wedge.

9. The method of claim 6 further comprising:
  threading said second nut into the second external annular wedge.

* * * * *